(12) United States Patent
Fernandes et al.

(10) Patent No.: US 8,454,056 B2
(45) Date of Patent: Jun. 4, 2013

(54) DOUBLE STRAP COUPLING APPARATUS

(75) Inventors: Leslie Fernandes, La Canada, CA (US); Charlie Rann, Woodland Hills, CA (US)

(73) Assignee: Senior Investments GmbH, Schaffhausen (CH)

( * ) Notice: Subject to any disclaimer, the term of this patent is extended or adjusted under 35 U.S.C. 154(b) by 27 days.

(21) Appl. No.: 13/136,324

(22) Filed: Jul. 28, 2011

(65) Prior Publication Data

US 2013/0026755 A1    Jan. 31, 2013

(51) Int. Cl.
*F16L 35/00* (2006.01)

(52) U.S. Cl.
USPC ............. 285/81; 285/82; 285/367; 285/410

(58) Field of Classification Search
USPC ............. 285/82, 114, 367, 408, 409, 410, 285/411, 366, 365, 407, 81
See application file for complete search history.

(56) References Cited

U.S. PATENT DOCUMENTS

| | | | |
|---|---|---|---|
| 2,178,683 A | 11/1939 | Frishman et al. |
| 2,426,423 A | 8/1947 | Woolsey |
| 2,521,127 A | 9/1950 | Price |
| 2,548,249 A | 4/1951 | Woolsey |
| 2,607,383 A | 8/1952 | Christophersen |
| 2,653,040 A | 9/1953 | Galluppi |
| 2,756,079 A | 8/1956 | Herman |
| 2,781,207 A | 2/1957 | Detweiler |
| 2,803,764 A | 8/1957 | Lundskow |
| 2,818,148 A | 12/1957 | Winther |
| 2,937,893 A | 5/1960 | Hill et al. |
| 2,944,698 A | 7/1960 | Pipes et al. |
| 3,089,046 A | 5/1963 | Jaeschke |
| 3,186,739 A | 6/1965 | Mahoff et al. |
| 3,198,559 A | 8/1965 | Synder |
| 3,200,478 A | 8/1965 | Emerson et al. |
| 3,223,438 A | 12/1965 | Cenzo |
| 3,250,961 A | 5/1966 | Parker |
| 3,261,624 A | 7/1966 | Hackman |
| 3,370,870 A | 2/1968 | Mahoff |
| 3,377,993 A | 4/1968 | Buck |
| 3,406,911 A | 10/1968 | Decker, Jr. et al. |
| 3,438,657 A | 4/1969 | Torres |
| 3,520,563 A | 7/1970 | Decker, Jr. |
| 3,537,477 A | 11/1970 | Mahoff |
| 3,550,713 A | 12/1970 | Swanson |
| 3,669,472 A | 6/1972 | Nadsady |
| 3,695,636 A | 10/1972 | Graves |
| 3,737,144 A | 6/1973 | Duncan |
| 3,753,205 A | 8/1973 | Tuger |

(Continued)

FOREIGN PATENT DOCUMENTS

JP    02142990    1/1990

*Primary Examiner* — David E Bochna
(74) *Attorney, Agent, or Firm* — Richard D. Harris (57) ABSTRACT

A clamp apparatus for holding together two abutting pipe ends, in which the pipe ends have radial flanges to facilitate the exerting of axial compressive forces on the pipe ends. The clamp includes a first strap structure and a fastening mechanism for providing circumferential compressive force on retainer segments configured to transfer the compressive force onto the flanges of the pipe ends. The clamp apparatus also includes a secondary strap structure for providing independent redundancy, relative to the primary strap, to supply back-up circumferential force onto the primary strap structure, should a failure occur in either of the fastening mechanism or the primary strap structure, to enable the clamp to maintain clamping force on the abutting pipe ends.

13 Claims, 7 Drawing Sheets

U.S. PATENT DOCUMENTS

| | | |
|---|---|---|
| 3,776,579 A | 12/1973 | Gale |
| 3,858,151 A | 12/1974 | Paskert |
| 3,891,291 A | 6/1975 | Nadsady et al. |
| 3,999,825 A | 12/1976 | Cannon |
| 4,008,937 A | 2/1977 | Filippi |
| 4,012,578 A | 3/1977 | Moran et al. |
| 4,177,363 A | 12/1979 | Keranen |
| 4,249,786 A | 2/1981 | Mahoff |
| 4,381,020 A * | 4/1983 | Daghe et al. .................... 138/99 |
| 4,553,775 A | 11/1985 | Halling |
| 4,598,936 A | 7/1986 | Doll et al. |
| 4,621,840 A | 11/1986 | Foster |
| 4,643,463 A | 2/1987 | Halling et al. |
| 4,723,795 A | 2/1988 | Shenoy |
| 4,779,901 A | 10/1988 | Halling |
| 4,795,300 A | 1/1989 | Tomaselli et al. |
| 4,819,973 A | 4/1989 | Pegon |
| 4,848,776 A | 7/1989 | Winckler |
| 4,900,070 A | 2/1990 | Runkles et al. |
| 4,923,584 A | 5/1990 | Bramhall, Jr. et al. |
| 4,944,860 A | 7/1990 | Bramhall, Jr. et al. |
| 5,078,510 A | 1/1992 | Bair et al. |
| 5,188,400 A | 2/1993 | Riley et al. |
| 5,269,194 A | 12/1993 | Reynolds |
| 5,286,135 A | 2/1994 | James |
| 5,318,255 A | 6/1994 | Facciano et al. |
| 5,368,069 A | 11/1994 | Felber |
| 5,407,237 A | 4/1995 | Smolowitz |
| 5,515,696 A | 5/1996 | Hutchison |
| 5,645,303 A | 7/1997 | Warehime et al. |
| 5,871,239 A | 2/1999 | Boscaljon et al. |
| 5,893,588 A | 4/1999 | Esser |
| 5,959,828 A | 9/1999 | Lewis et al. |
| 6,102,750 A | 8/2000 | Little et al. |
| 6,357,699 B1 | 3/2002 | Edberg et al. |
| 6,880,859 B2 | 4/2005 | Breay et al. |
| 7,144,047 B2 | 12/2006 | Dole |
| 7,320,485 B2 * | 1/2008 | Amendolea et al. .......... 285/407 |
| 8,181,314 B2 * | 5/2012 | Mohlin et al. .................. 24/279 |

\* cited by examiner

DOUBLE STRAP COUPLING APPARATUS

BACKGROUND OF THE INVENTION

The Technical Field

The present invention is directed to clamping devices and systems that may be employed in ducting applications for holding two abutting pipe ends in a clamped, substantially fluid-tight configuration, without permanently affixing the pipe ends to one another. Such clamping systems may particularly be used in aerospace applications, such as connecting the ends of adjacent duct sections in an aircraft pneumatic system, in which turbine bleed gases are conducted from the engines throughout the aircraft.

SUMMARY OF THE INVENTION

The present invention is directed to a coupling apparatus for releasably connecting two closely-adjoining disposed pipe ends together, wherein each pipe end has a longitudinal axis, and wherein each pipe end has a flange extending radially therefrom, so that when the pipe ends are positioned to substantially adjoin one another. The flanges of the pipe ends are substantially juxtaposed to one another.

The coupling apparatus comprises an arcuate primary strap member, having two adjacent spaced-apart free ends, the arcuate primary strap member being configured to be placed circumferentially around the juxtaposed flanges of the two closely-adjoining ends. At least two retainer segments are provided, in which each of which at least two retainer segments is positioned within an inner surface of the arcuate primary strap member. Each retainer segment further has a concavity disposed therein to receive and exert at least an axial compressive force on each of the substantially juxtaposed flanges of the pipe ends, when the coupling apparatus is mounted about the pipe ends.

A fastening mechanism is operably connected to the ends of the primary strap member and configured to be selectively tightened and loosened, to selectively bring together or move apart the two adjacent spaced-apart free ends, respectively, so as to decrease or increase the total circumferential length of the primary strap member and the fastening mechanism, respectively, to, in turn, exert or remove axial compressive force on the flanges of the closely-adjoining pipe ends.

A secondary strap element encircles at least most of the circumference of the arcuate primary strap member, and cooperatively engages with the fastening mechanism, to facilitate maintenance of the coupling apparatus about the closely-adjoining pipe ends, in the event of a failure of the primary strap member. The secondary strap element provides a second structure to maintain the coupler apparatus in place on the pipe ends, which operates independently of the primary strap element to provide an independent redundancy therefor.

DETAILED DESCRIPTION OF THE INVENTION

While this invention is susceptible of embodiment in many different forms, there are shown and described in the drawings and associated text, one or more specific embodiments, with the understanding that the present disclosure is to be considered an exemplification of the principles of the invention and is not intended to limit the invention to the embodiments illustrated.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an, embodiment in the present disclosure can be, but not necessarily are, references to the same embodiment; and, such references mean at least one of the embodiments.

Reference in this specification to "one embodiment" or "an embodiment" is means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the is art to which this disclosure pertains. In the case of conflict, the present document, including definitions will control.

In various industrial piping applications, such as in aerospace applications, it is desirable to be able to connect two abutting pipe ends in a substantially leakproof manner, without permanently attaching the pipe ends together (such as by welding, etc.). In such a situation, clamps may be employed which are configured to exert both radial and axial compression on the abutting pipe ends.

Figure 1:
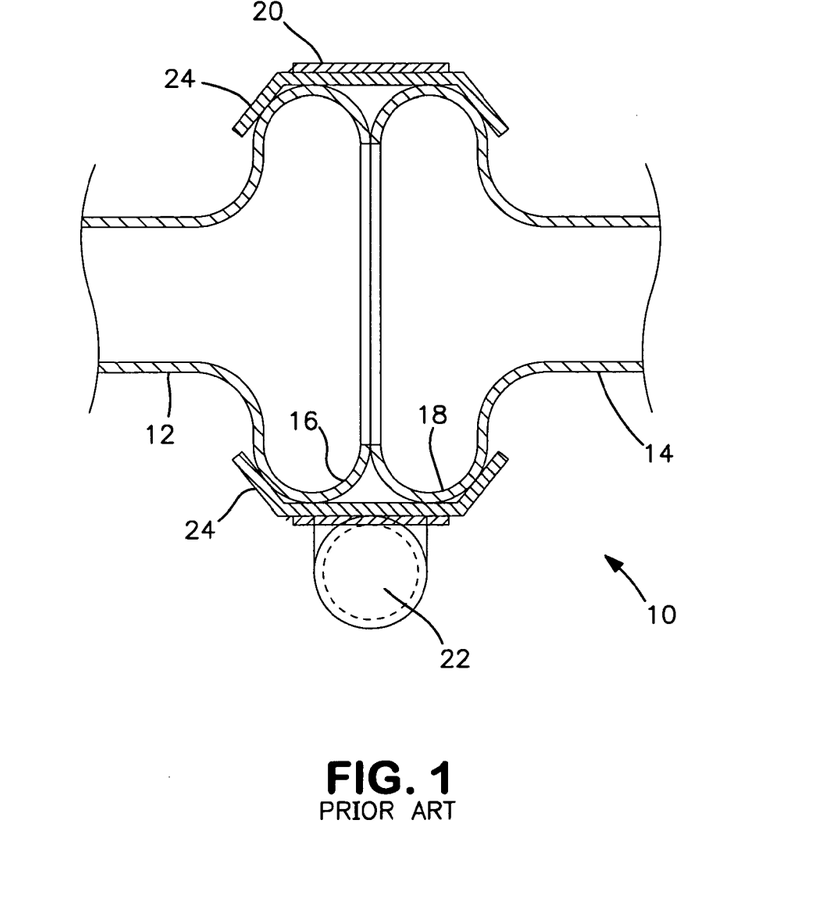
FIG. 1 is a side elevation, in section of a representative typical prior art V-clamp fitting holding together two pipe ends.
Figure 2:
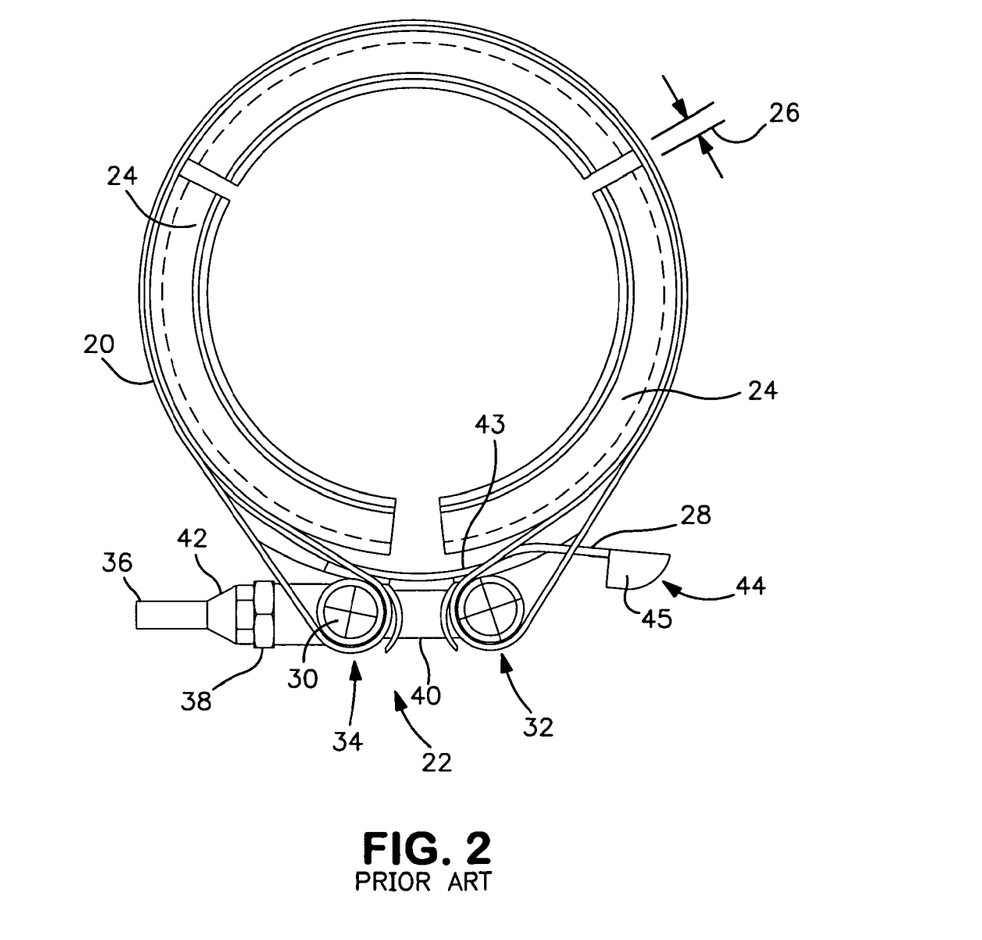
FIG. 2 is an end elevation of the prior art V-clamp fitting of FIG. 1, in which the pipe ends have been omitted for clarity of illustration.
Figure 3:
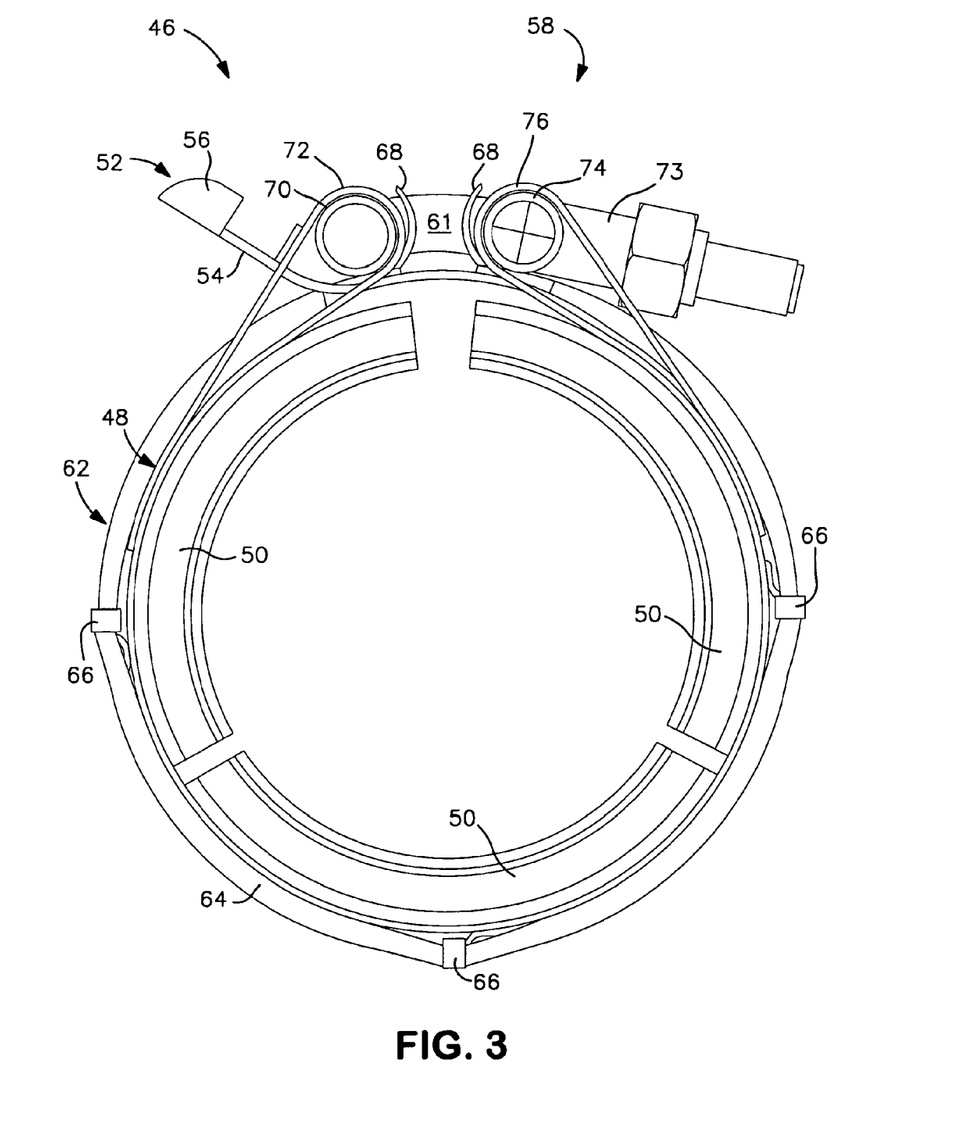
FIG. 3 is an end elevation of the clamping apparatus according to a preferred embodiment of the invention.
Figure 4:
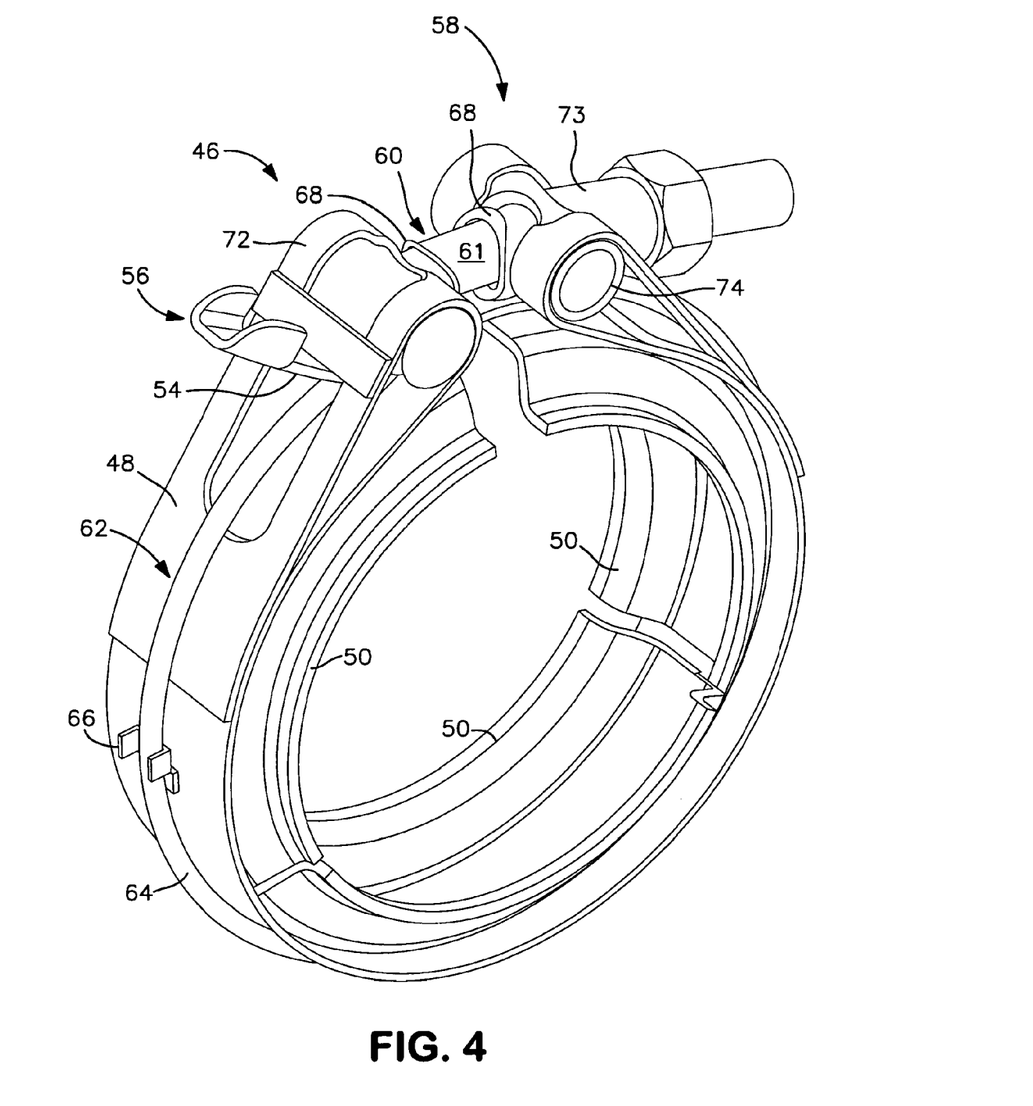
FIG. 4 is a perspective view thereof.
Figure 5:
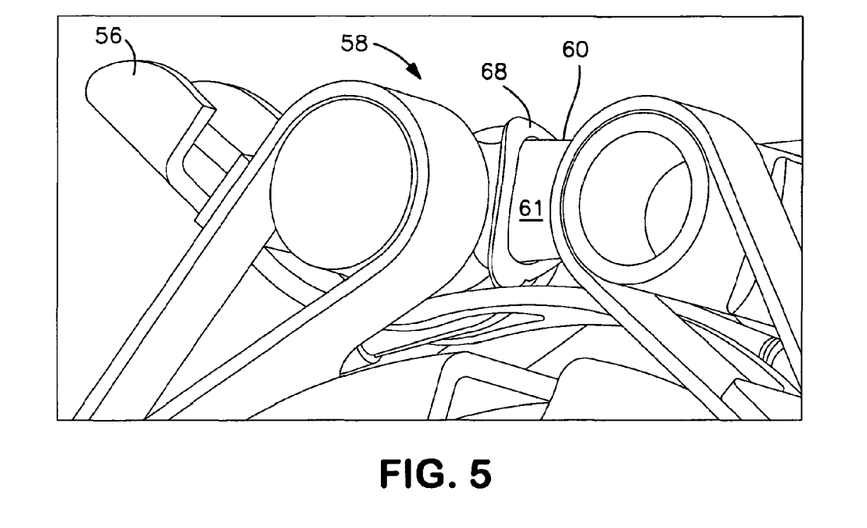
FIG. 5 is an enlarged right perspective view thereof.
Figure 6:
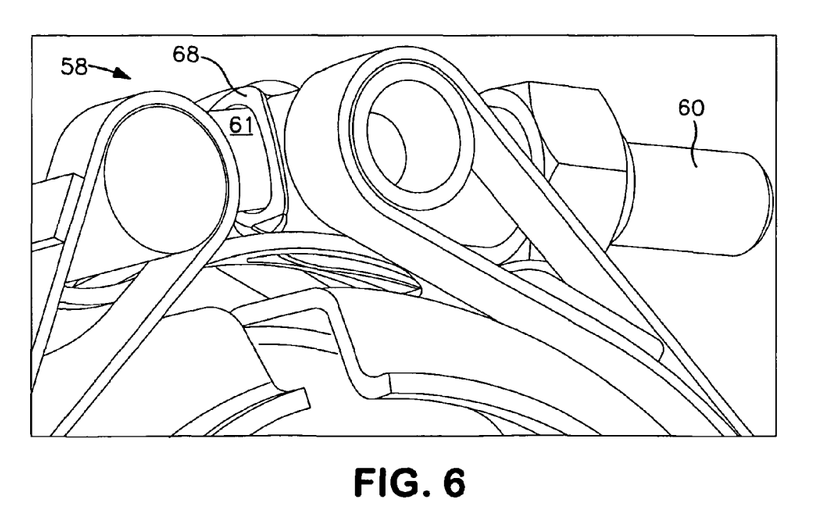
FIG. 6 is an enlarged left perspective view thereof.

FIGS. 1 and 2 illustrate schematically, a typical clamp for connecting, in compression, two pipe ends. The clamp illustrated in FIGS. 1 and 2 is of the type which corresponds to the requirements of Society of Automotive Engineers ("SAE") Standards AIR860, AS4751, AS1960 (all as of 2009), and AS24563, the complete disclosures of which are hereby expressly incorporated by reference. Such clamps are configured to operate in temperature regimes of about −65° F. to about 1000° F., and pressure regimes of about 25 psi to about 300 psi. Referring to FIG. 1, clamp 10 is provided to connect together pipe ends 12 and 14, respectively. Each pipe end 12, 14, is provided with a radially extending connection flange 16, 18, respectively. Flanges 16, 18 may be sheet metal flanges suitably attached to pipe ends 12, 14, or they may be machined flanges integral to pipe ends 12, 14, or otherwise suitably formed thereon. As shown in FIGS. 1 and 2, clamp 10 includes an encircling strap 20 (fabricated, e.g., from sheet metal of any suitable metal or alloy sufficient to withstand the conditions described above), which circumferentially surrounds and is configured, upon tightening of fastening mechanism 22, to exert radially inwardly directed compression pressure on two or more retainer segments 24 (preferably configured from any suitable metal or alloy sufficient to withstand the conditions described above), which are attached to the inner surface of strap 20. Two or more gaps 26 are provided, to enable the ends of retainer segments 24 to pivot slightly toward one another, to accommodate the reduction in circumference of strap 20, upon tightening of fastening mechanism 22, to enable the radial compression of the pipe ends (not shown in FIG. 2) being joined. The retainer segments are typically configured so that up to 25% of the total retainer member circumference may fail, and still exert sufficient axial clamping force to maintain leakage to within predetermined maximum values, as established by SAE Standard AS4751.

Fastening mechanism 22 includes, in a typical clamp, bushings 28, 30, which are received in loops 32, 24, formed in the opposite ends of strap 20. One bushing, e.g., bushing 28, is configured to pivotably receive the cross-bar of a T-bolt 36. The opposite bushing, e.g., bushing 30, is configured to receive a trunion 38, which is, in turn, configured to receive the shaft 40 of T-bolt 36. A self-locking nut 42 is threadably received on shaft 40.

In such a fastening mechanism 22, to place clamp 10 on a joint between two pipe ends, nut 42 is loosened, and T-bolt 36 is pulled through, and pivoted out of and away from trunion 38, thus permitting the opposed ends of strap 20 to be pulled away from one another, and placed over the abutted ends of the pipes to be joined. Once clamp 10 is positioned as desired, T-bolt 36 is pivoted around toward, and inserted through placed in trunion 38, and nut 42 is tightened as desired, to bear against the outer end of the trunion, to impose the desired compression on the joint, with retainer segments 24 exerting both axial and radial compression on flanges 16, 18 of the pipe ends 12, 14.

The specific structures which are shown as the trunion and the T-bolt in FIGS. 1 and 2 are shown by way of example, and a number of bolt and trunion structures may be substituted therefor, without altering the operation of the clamp.

To provide a measure of independent redundancy for fail-safe protection, the T-bolt 36 and self-locking nut 42 in clamp 10 may be provided with a safety latch 44, which, in the example of the prior art clamp shown in FIGS. 1 and 2, will be a tang or tab 43 of metal, extending from one end region of strap 20, through an aperture typically provided in the opposed end of strap 20. As a practical matter, strap 20 is far more likely to suffer catastrophic failure, than any other component of clamp 10, especially, e.g., T-bolt 36.

Extending from tang or tab 43 will be two wings 45 which, once clamp 10 has been positioned in place and tightened down over the pipe ends, are bent upwardly, parallel to one another, and perpendicular to the plane of strap 10. In this way, should strap 20 fail, the wings 45 of latch 44 will engage the edge of the opening in the strap through which the tang passes, and prevent the tang or tab from being pulled through the aperture in that end of the strap 10, and maintain a certain level of tension in the strap to help prevent the pipe ends from being pulled apart. Typically, latch 44 is provided with a relatively short tab or tang, so that wings 45 abut the edges of the aperture in the adjacent strap end (i.e., there is little or no "slack" in the tab or tang, once fastening mechanism 20 has been suitably tightened.

In certain industrial applications, it may be desirable to provide additional safeguards for the integrity of the joint connector, other than the single safeguard of the safety latch shown in the prior art apparatus of FIGS. 1 and 2.

FIGS. 3-6 show an embodiment of the present invention. Clamp apparatus 46 may be used in a variety of industrial applications, such as in ducting for aerospace applications, such as conveying bleed air from turbine engines that is used for aircraft Environmental Control Systems and for purposes such as deicing. Such pneumatic systems employ duct gas bleed leak detectors, which are temperature sensitive. Clamp 46 may be substantially similar to clamp 10, having a strap 48, and two or more retainer segments 50. Fastening mechanism 58 will include a safety latch 52, having wings 54, and an elongated tang 56, which will be operably configured to be long enough, so that, if T-bolt 60 fails, strap 48 will be permitted to loosen enough, to enable the pipe ends to separate enough to leak (and thus be detected by the duct gas bleed leak detection system), but not enough that clamp 46 falls off the joint and permits the pipe ends to become completely separated.

T-bolt 60 is pivotably mounted in bushing 70, held in loop 72 of strap 48. Trunion 73 is pivotably mounted in bushing 74, which is held in loop 76 of strap 48.

Figure 7:
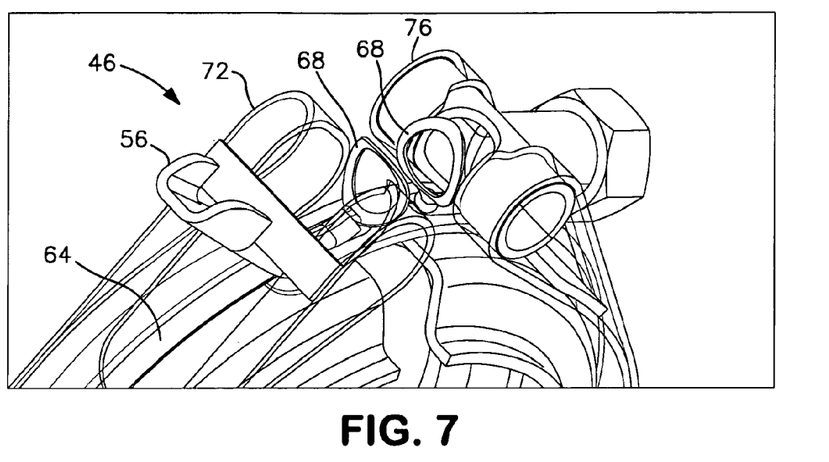
FIG. 7 is an enlarged perspective view of the fastening mechanism of the clamping apparatus of the present invention, with the bolt removed to show the loops at the ends of the secondary strap or cable.
Figure 8:
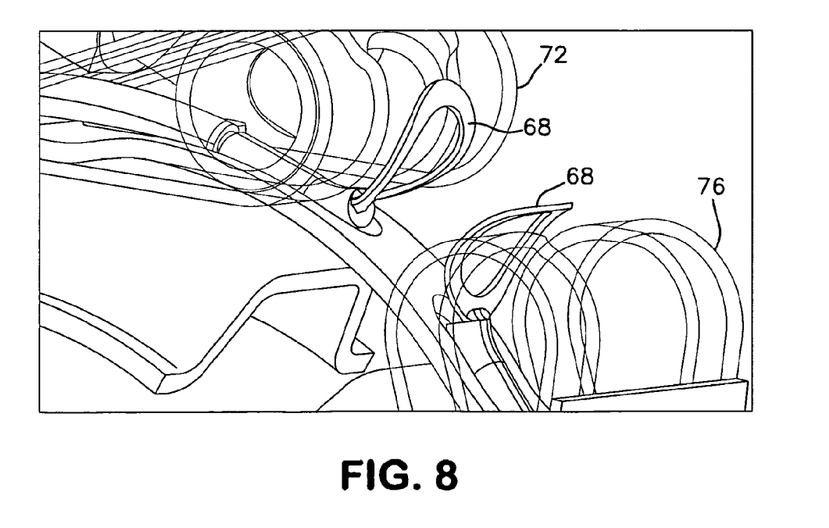
FIG. 8 is a similar enlarged perspective view thereof, from a reverse point of view.
Figure 9:
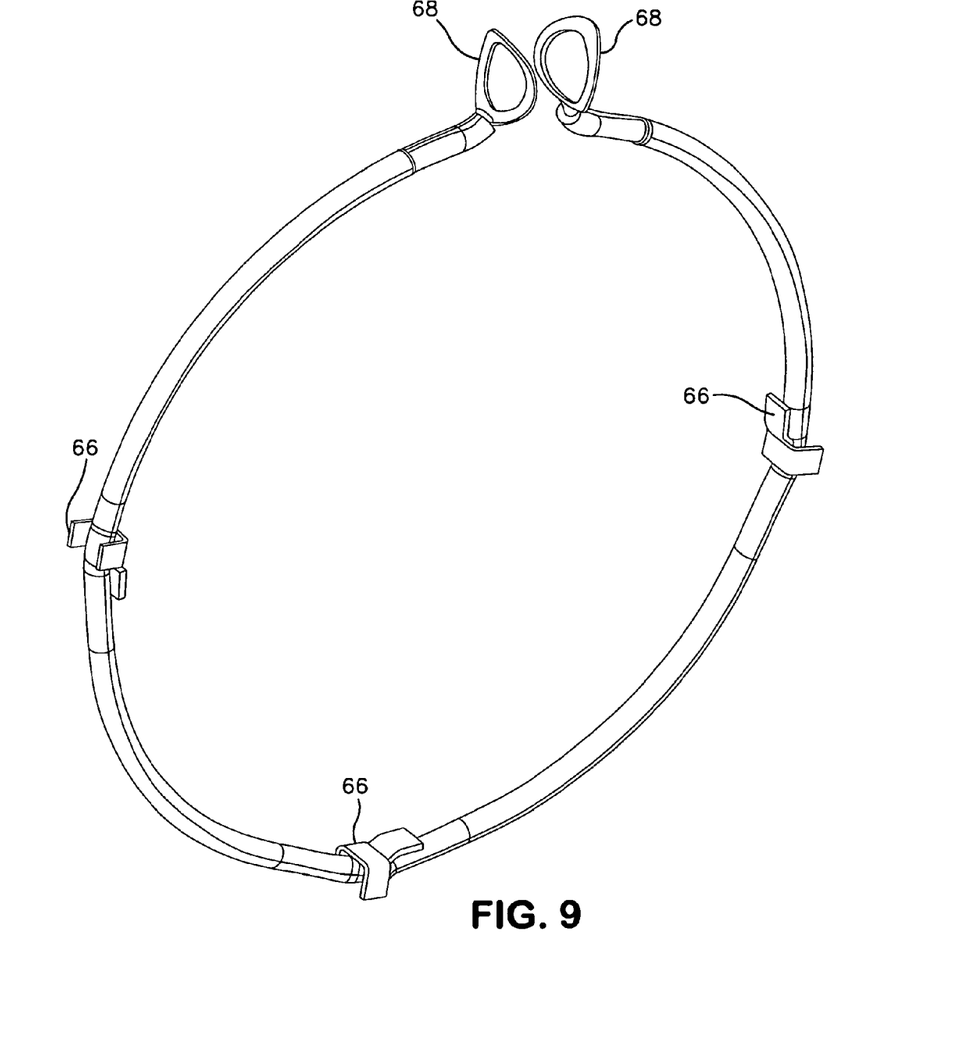
FIG. 9 is a plan view of a secondary strap or cable according to a preferred embodiment of the invention.

The present invention also includes a secondary strap mechanism, to hold clamp 46 onto the pipe ends, should strap 48 fail, especially near or in the zone of the gaps between retainers 50. Secondary strap mechanism 62 includes wire or cable 64 (FIG. 9), which is held in place on the outside of strap 48 by guide structures 66, which are permanently affixed to cable 64, and, in turn, affixed, such as by welding, to the outside surface of strap 48. The end of wire or cable 64 terminate in loops 68, which are placed over shaft 61 of T-bolt 60 (see FIGS. 7 and 8).

When clamp 46 is mounted over a pair of duct ends to create a joint connection, and tightened in place, strap 48 and fastening mechanism 58 is under tension. However, cable 64, especially in the portion between loops 68 and the nearest guide structures 66, is slack at that time. In the event of a catastrophic failure of strap 48, because T-bolt 60 will be intact, loops 72, 76 of strap 48 will remain in fixed positions relative to one another. Therefore, loops 68 attached to the ends of cable 64 will be held in place. However, the remaining portions of strap 48 will tend to expand, pushing radially outwardly against strap 68, and placing it under tension. Preferably, the amount of slack initially provided in strap 68 will not be sufficient to permit clamp 46 to come off of the flanges of the adjacent pipe ends, though some amount of leakage may occur, the amount of which may be controlled by the amount of initial slack provided in cable 64 at the time of installation.

By providing secondary cable 64, coupler 46 is provided with an independent redundancy (relative to primary strap 48) for holding retainer segments 50 in position about the flanges of the pipe ends. Because cable 64 is directly anchored, at its ends to T-bolt 60, it is capable of operating independently of strap 48.

The foregoing description and drawings merely explain and illustrate the invention, and the invention is not limited thereto, except as those skilled in the art who have the present disclosure before them will be able to make modifications and variations therein without departing from the scope of the invention.

The invention claimed is:

1. A coupling apparatus for releasably connecting two closely-adjoining disposed pipe ends together, wherein each pipe end has a longitudinal axis, and wherein each pipe end has a flange extending radially therefrom, so that when the pipe ends are positioned to substantially adjoin one another, the flanges of the pipe ends are substantially juxtaposed to one another, the coupling apparatus comprising:
   an arcuate primary strap member, having two adjacent spaced-apart free ends, the arcuate primary strap member being configured to be placed circumferentially around the juxtaposed flanges of the two closely-adjoining ends;
   at least two retainer segments, each of which at least two retainer segments is positioned within an inner surface of the arcuate primary strap member, each retainer segment further having a concavity disposed therein to receive and exert at least an axial compressive force on each of the substantially juxtaposed flanges of the pipe ends, when the coupling apparatus is mounted about the pipe ends;
   a fastening mechanism operably connected to the ends of the primary strap member and configured to be selectively tightened and loosened, to selectively bring together or move apart the two adjacent spaced-apart tree ends, respectively, so as to decrease or increase the total circumferential length of the primary strap member and the fastening mechanism, respectively, to in turn, exert or remove axial compressive force on the flanges of the closely-adjoining pipe ends; and
   a secondary strap element, encircling at least most of the circumference of the arcuate primary strap member, and cooperatively engaged with the fastening mechanism, to facilitate maintenance of the coupling apparatus about the closely-adjoining pipe ends, in the event of a failure of the primary strap member.

2. The coupling apparatus according to claim 1, wherein the fastening mechanism comprises:
   an elongated connecting member, mounted to one of the ends of the primary strap member; and
   a mounting device, mounted to the other of the ends of the primary strap, for releasably engaging the elongated connecting member,
   wherein the elongated connecting member, the mounting device and the primary strap member are operably configured such that under stress, the primary strap member will undergo failure before the elongated connecting member or the mounting device.

3. The coupling apparatus according to claim 2, wherein the secondary strap mechanism comprises:
   a flexible elongated member, mounted, for a majority of its length, along an outside surface of the primary strap member and partially encircling same;
   the flexible elongated member having two opposed ends; and
   a mounting loop disposed on each of the two opposed ends of the flexible elongated member, wherein the elongated connecting member passes through each mounting loop and the mounting loops are positioned between the ends of the primary strap, so that the mounting loops will be constrained on the elongated connecting member to be able to be moved no more than a predetermined distance from one another;
   so that upon failure of the primary strap member, remaining failed portions of the primary strap member will be prevented from expanding more than a predetermined amount by the partially encircling flexible elongated member.

4. The coupling apparatus according to claim 3, wherein the flexible elongated member is metal cable.

5. The coupling apparatus according to claim 3, further comprising at least one guide member, affixed to an outer surface of the primary strap member, for facilitated positioning of the flexible elongated member.

6. The coupling apparatus according to claim 5, wherein the at least one guide member comprises a plurality of guide members affixed at a plurality of circumferentially spaced positions about the outer surface of the primary strap member.

7. The coupling apparatus according to claim 5, wherein the at least one guide member and the flexible elongated member are permanently affixed to one another to prevent movement of the flexible elongated member relative to the at least one guide member.

8. The coupling apparatus according to claim 2, wherein the elongated connecting member is a T-bolt having a threaded end, and the mounting device comprises:
   a trunion having an aperture therethrouuh, through which the threaded end of the T-bolt is inserted; and
   a locking nut, placed on the threaded end of the T-bolt after the threaded end of the T-bolt has been passed through the trunion.

9. The coupling apparatus according to claim 1, further comprising a safety latch element, operably associated with the primary strap member.

10. The coupling apparatus according to claim 9, wherein the safety latch element comprises:
    a tang, extending from the primary strap member, proximate one of the ends thereof, and through an aperture disposed proximate the other of the ends of the primary strap member; and
    at least one tab emanating from the tang the at least one tab preventing the tang from being pulled back through the aperture in the other of the ends of the primary strap member, in the event of failure of the primary strap member, so as to limit opening distortion of the primary strap member upon failure of same, and prevent the coupling apparatus from being displaced from the closely-adjoining pipe ends following failure of the primary strap member.

11. The coupling apparatus according to claim 10, wherein the tang of the safety latch apparatus is sufficiently long, to enable a predetermined amount of leakage to occur, from the closely-adjoining pipe ends, to enable prompt detection of the leakage by a leak detection system.

12. The coupling apparatus according to claim 1, wherein the closely-adjoining pipe ends are in sealing, abutting contact with one another.

13. The coupling apparatus according to claim 1, wherein the closely-adjoining pipe ends are minutely spaced apart from one another.

* * * * *